US008706336B2

(12) United States Patent
Inui

(10) Patent No.: US 8,706,336 B2
(45) Date of Patent: Apr. 22, 2014

(54) MOTORCYCLE

(75) Inventor: Shujiro Inui, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 107 days.

(21) Appl. No.: 13/355,612

(22) Filed: Jan. 23, 2012

(65) Prior Publication Data

US 2012/0197470 A1    Aug. 2, 2012

(30) Foreign Application Priority Data

Feb. 2, 2011   (JP) ................................. 2011-020572

(51) Int. Cl.
*B62D 61/02* (2006.01)
*B60L 9/00* (2006.01)

(52) U.S. Cl.
USPC ........ 701/22; 180/90.6; 180/89.1; 180/89.17; 180/218; 180/220

(58) Field of Classification Search
USPC ........ 701/22; 180/218, 220, 89.1, 89.17, 90.6
See application file for complete search history.

(56) References Cited

U.S. PATENT DOCUMENTS

| 3,251,107 | A | * | 5/1966 | Scott ........................... 24/134 R |
| 3,908,780 | A | * | 9/1975 | McClure et al. .............. 180/271 |
| 4,095,823 | A | * | 6/1978 | Nishida ...................... 280/764.1 |
| 5,908,453 | A | * | 6/1999 | Tabata et al. .................... 701/22 |
| 6,047,786 | A | * | 4/2000 | Stevenson et al. ........... 180/65.1 |
| 6,107,691 | A | * | 8/2000 | Gore et al. ..................... 290/1 R |
| 7,721,835 | B2 | * | 5/2010 | Radtke ........................ 180/205.5 |
| 2002/0007977 | A1 | * | 1/2002 | Ishii et al. ...................... 180/219 |
| 2005/0035583 | A1 | * | 2/2005 | Hinton .......................... 280/755 |
| 2008/0271938 | A1 | * | 11/2008 | Gulak ............................ 180/220 |
| 2010/0042280 | A1 | * | 2/2010 | Cominetti ....................... 701/22 |
| 2010/0228405 | A1 | * | 9/2010 | Morgal et al. ..................... 701/2 |
| 2010/0332059 | A1 | * | 12/2010 | Lee et al. ......................... 701/22 |
| 2011/0282528 | A1 | * | 11/2011 | Hsieh et al. ..................... 701/22 |
| 2011/0295454 | A1 | * | 12/2011 | Meyers .......................... 701/22 |
| 2012/0004798 | A1 | * | 1/2012 | Sakamoto et al. .............. 701/22 |

FOREIGN PATENT DOCUMENTS

JP            04-243677         8/1992

* cited by examiner

*Primary Examiner* — Behrang Badii
*Assistant Examiner* — Daniel L Greene
(74) *Attorney, Agent, or Firm* — Squire Sanders (US) LLP

(57) ABSTRACT

A motorcycle apparatus is provided which may include a step disposed between a front wheel and a rear wheel, and to support feet of a rider and a side cover configured to cover a lateral side of the vehicle body. The apparatus may also include a charging electric cable for charging the battery from an outside power source and an electric cable housing unit to house the charging electric cable in the vehicle body, and in which the charging electric cable is connected to the vehicle body. The apparatus may further include a housing opening portion to be opened for inserting or removing a leading end portion of the charging electric cable into or from the electric cable housing unit and an opening lid to close the housing opening portion. The housing opening portion may be located under the step and provided to the side cover.

18 Claims, 13 Drawing Sheets

MOTORCYCLE

BACKGROUND

1. Field

The present invention relates to a vehicle such as a motorcycle that travels using a driving force of a motor.

2. Description of Related Art

Among the motorcycles that travel using a driving force of a motor, a motorcycle having the following structure has been disclosed, for example, in Patent Document 1 (Japanese Patent Application Publication No. Hei 4-243677). In this structure, a charging cable (electric cable) is housed in a cable housing unit under a seat, and at the time of charging, the charging cable is drawn to an outside of a vehicle body from a gap between an opening portion of the cable housing unit and the seat.

In the motorcycle disclosed in Patent Document 1, however, the charging cable is extended from a relatively upper position of the vehicle body at the time of charging. Thus, the length of the charging cable has to be long in considering a case where an outlet of an external power supply is placed on the floor or near the floor. The longer the charging cable is, the higher the cost of the charging cable. In addition, a space for housing the long charging cable needs to be secured in the vehicle body. As a result, the vehicle body increases in size.

SUMMARY

The present invention aims to provide a motorcycle allowing a reduction in the length of a charging electric cable.

A first aspect of the present invention provides, in certain embodiments, a motorcycle that includes a vehicle body, a front wheel, a rear wheel, a motor, and a battery configured to supply power to the motor and that travels using a driving force of the motor. The motorcycle can include a step which is placed between the front wheel and the rear wheel in a side view and on which a rider puts his or her feet. A side cover can be configured to cover a lateral side of the vehicle body. A charging electric cable can be provided, for charging from outside of the motorcycle. An electric cable housing unit is used to house the charging electric cable in the vehicle body. The charging electric cable is connected to the vehicle body. A housing opening portion opened can be provided for inserting or removing a leading end portion of the charging electric cable into or from the electric cable housing unit. The motorcycle can further include an opening lid configured to close the housing opening portion, and the housing opening portion can be located under the step and provided to the side cover.

In a second aspect, the motorcycle can further include a lid sensor configured to detect an opened or closed state of the opening lid, in which the opening lid is configured not to be positioned in the closed state while the charging electric cable is located outside the housing opening portion. Upon detection of the opened state of the opening lid by the lid sensor, the rider is informed of the opened state of the opening lid.

In a third aspect, the rider can be informed of the opened state of the opening lid by reduction in an output of the motor.

In a fourth aspect, the motorcycle can further include a side kickstand installed near the step. The housing opening portion and the opening lid can be placed on a side where the side kickstand is located in a vehicle body left-right direction, and at a position rearward of a side kickstand pivot serving as a rotation supporting point of the side kickstand. The configuration is such that when being flipped up rearward and thus positioned in its retracted state, the side kickstand in the retracted state restricts opening of the opening lid.

In a fifth aspect, the motorcycle can further include a side kickstand installed near the step. The side kickstand can be configured such that, when the opening lid is in the opened state, the opening lid comes in contact with the side kickstand to prevent the side kickstand from rotating from its upright state to its retracted state. The side kickstand can include a side kickstand sensor configured to detect whether or not the side kickstand is in the retracted state. In a case where the side kickstand sensor detects that the side kickstand is not in the retracted state, the output of the motor can be reduced.

In a sixth aspect, the motorcycle can further include a side kickstand installed near the step, and the opening lid is configured to be attached to the side kickstand and thus to be opened or closed by an operation to position the side kickstand in its upright state or its retracted state.

In a seventh aspect, the opening lid is configured not to be positioned in a closed state while the charging electric cable is located outside the housing opening portion. A sensor, configured to detect the opened or closed state of the opening lid, can be provided to one of the electric cable housing unit and the side kickstand. Upon detection of the opened state of the opening lid by the sensor, the output of the motor can be reduced.

In an eighth aspect, the motorcycle can further include an inner lid provided inside the electric cable housing unit and configured to cover the charging electric cable housed in the electric cable housing unit.

In a ninth aspect, a length of the charging electric cable can be set at a length not reaching a contact patch of the rear wheel.

In a tenth aspect, the length of the charging electric cable is set at a length not reaching a contact patch of the front wheel.

According to the first aspect of the present invention, the housing opening portion is at least located under the step and provided to the side cover. Thus, since the charging electric cable can be removed from the area under the step, the step is unlikely to hider the removing of the charging electric cable from the electric cable housing unit. Moreover, since the charging electric cable can be removed from the area under the step, the removed charging electric cable is placed near the ground where an outlet of an external power supply is normally placed. Thus, the length of the charging electric cable can be reduced.

According to the second aspect of the present invention, the opening lid cannot be positioned in the closed state while the charging electric cable is located outside the housing opening portion. In addition, upon detection of the opened state of the opening lid by the lid sensor, the rider is informed of the opened state of the opening lid. Thus, it is possible to prevent the rider from forgetting to house the charging electric cable in the electric cable housing unit and to close the opening lid.

According to the third aspect of the present invention, the rider is informed of the opened state of the opening lid by reduction in the output of the motor. Thus, it is not necessary to additionally provide an indicator or the like to inform the rider of the opened state of the opening lid.

According to the fourth aspect of the present invention, in a case where the side kickstand is flipped up rearward and thus positioned in the retracted state, the side kickstand in the retracted state restricts opening of the opening lid. Accordingly, the side kickstand in the retracted state can prevent the opening lid from opening while the motorcycle travels.

According to the fifth aspect of the present invention, in a case where the side kickstand sensor detects that the side kickstand is not in the retracted state, the output of the motor is reduced. Thus, it is possible to detect by using the side kickstand sensor whether or not the opening lid is in the closed state. In addition, it is not necessary to additionally provide an indicator or the like to inform the rider that the side kickstand is not in the retracted state.

According to the sixth aspect of the present invention, the opening lid is configured to be opened or closed by the operation to position the side kickstand in its upright state or its retracted state. Thus, the opening lid can be easily opened or closed.

According to the seventh aspect of the present invention, in a case where the sensor configured to detect the opened or closed state of the opening lid, which is provided to any one of the electric cable housing unit and the side kickstand, detects the opened state of the opening lid, the output of the motor is reduced. Thus, it is possible to inform the rider of the states of the side kickstand and the opening lid.

According to the eighth aspect of the present invention, the charging electric cable housed in the electric cable housing unit is covered by the inner lid even when the side kickstand is in the upright state and the opening lid is opened. Thus, the charging electric cable can be protected.

According to the ninth aspect of the present invention, even when the motorcycle is moved forward while being pushed by the rider in a state where the charging electric cable is located outside the housing opening portion, the charging electric cable is not run over by the rear wheel.

According to the tenth aspect of the present invention, even when the motorcycle is moved rearward while being pulled by the rider in a state where the charging electric cable is located outside the housing opening portion, the charging electric cable is not run over by the front wheel.

DETAILED DESCRIPTION

Hereinafter, a description will be given of a motorcycle according to a first embodiment of the present invention with reference to FIG. 1 to FIG. 9. In this embodiment, a description will be given using a motorcycle of scooter type that travels using a driving force of a motor, as an example of the motorcycle.

Figure 1:
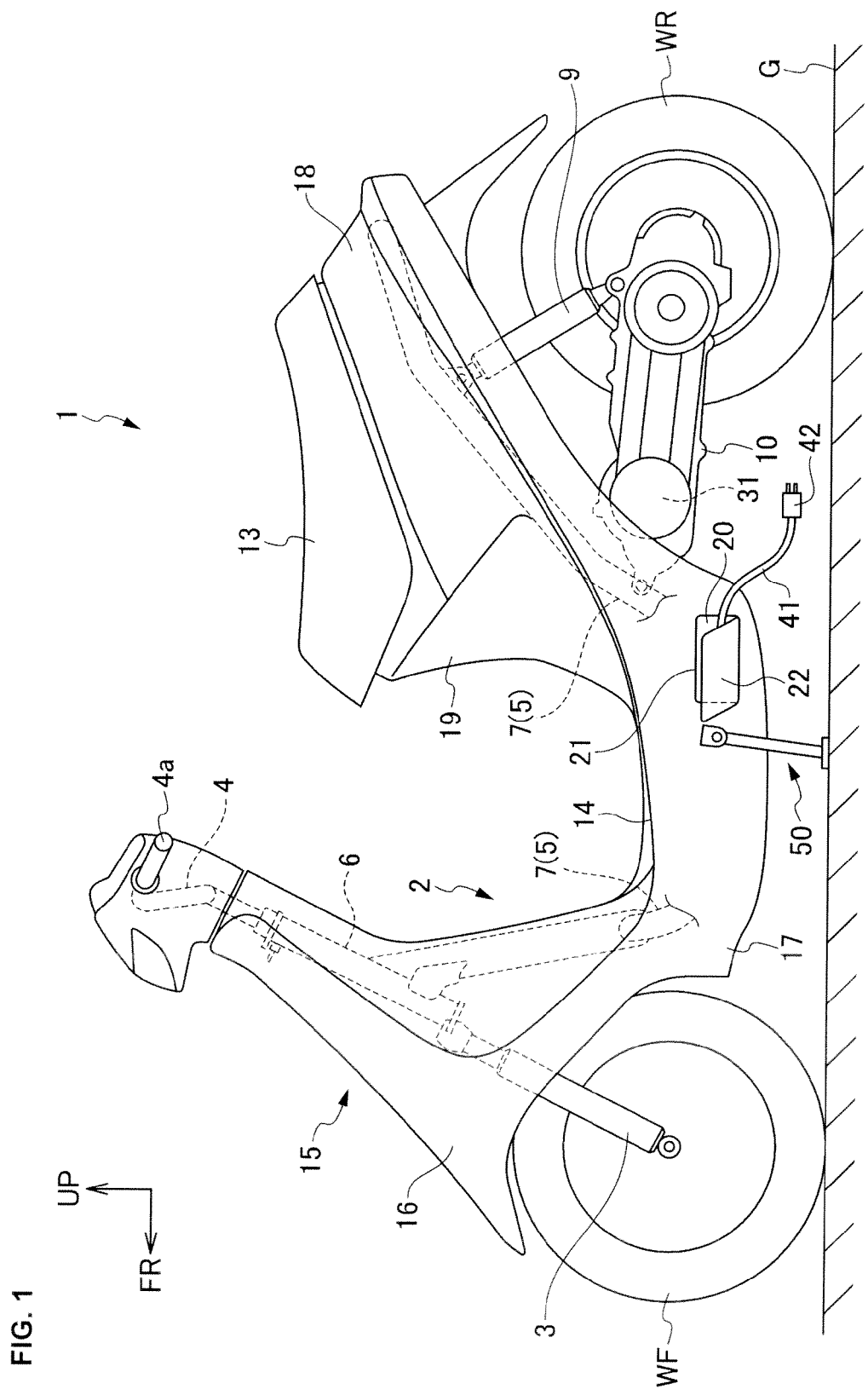
FIG. 1 is a left-side view showing a motorcycle according to a first embodiment of the present invention in a state where a side kickstand is positioned in its upright state and a charging cable is removed from a cable housing unit.
Figure 2:
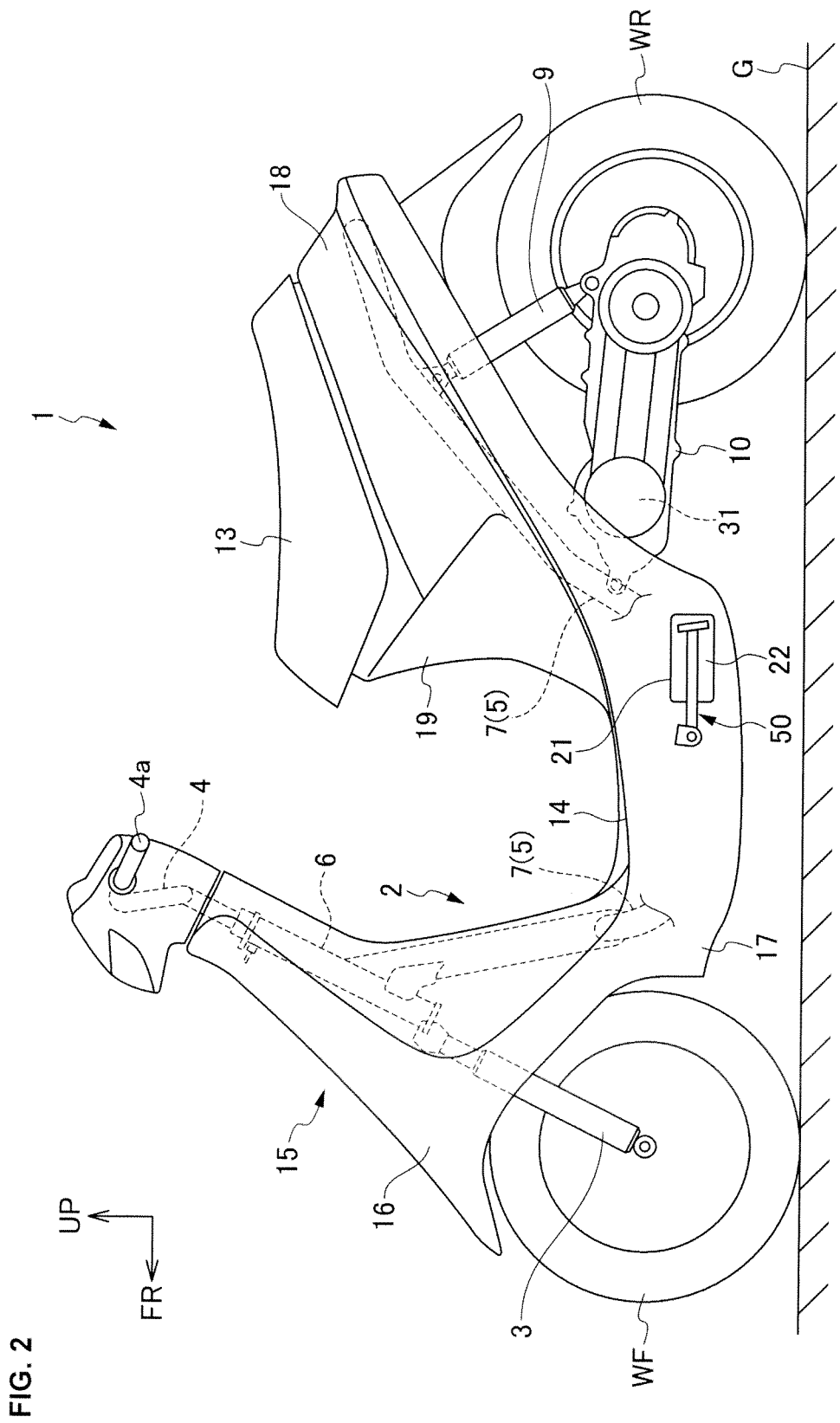
FIG. 2 is a left-side view showing the motorcycle according to the first embodiment of the present invention in a state where the side kickstand is positioned in its retracted state and the charging cable is housed in the cable housing unit.
Figure 3:
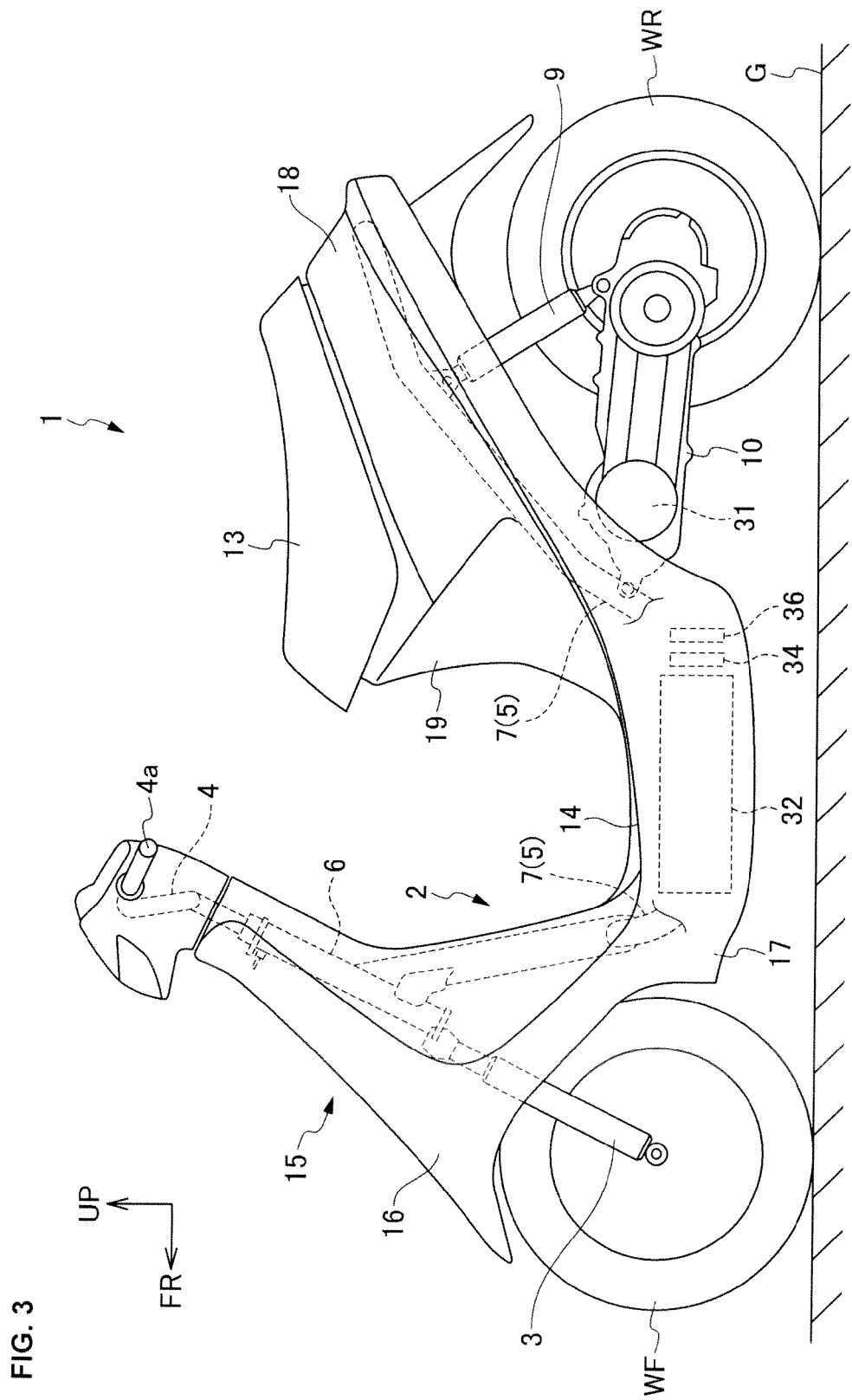
FIG. 3 is a left-side view showing a battery, a BMU and an ECU of the motorcycle according to the first embodiment of the present invention.

FIG. 1 is a left-side view showing the motorcycle according to the first embodiment of the present invention in a state where a side kickstand is positioned in its upright state, and a charging cable is removed from a cable housing unit. FIG. 2 is a left-side view showing the motorcycle according to the first embodiment of the present invention in a state where the side kickstand is positioned in its retracted state, and the charging cable is housed in the cable housing unit. FIG. 3 is a left-side view showing a battery, a BMU (battery managing unit) and an ECU (electric control unit) of the motorcycle according to the first embodiment of the present invention.

Figure 4:
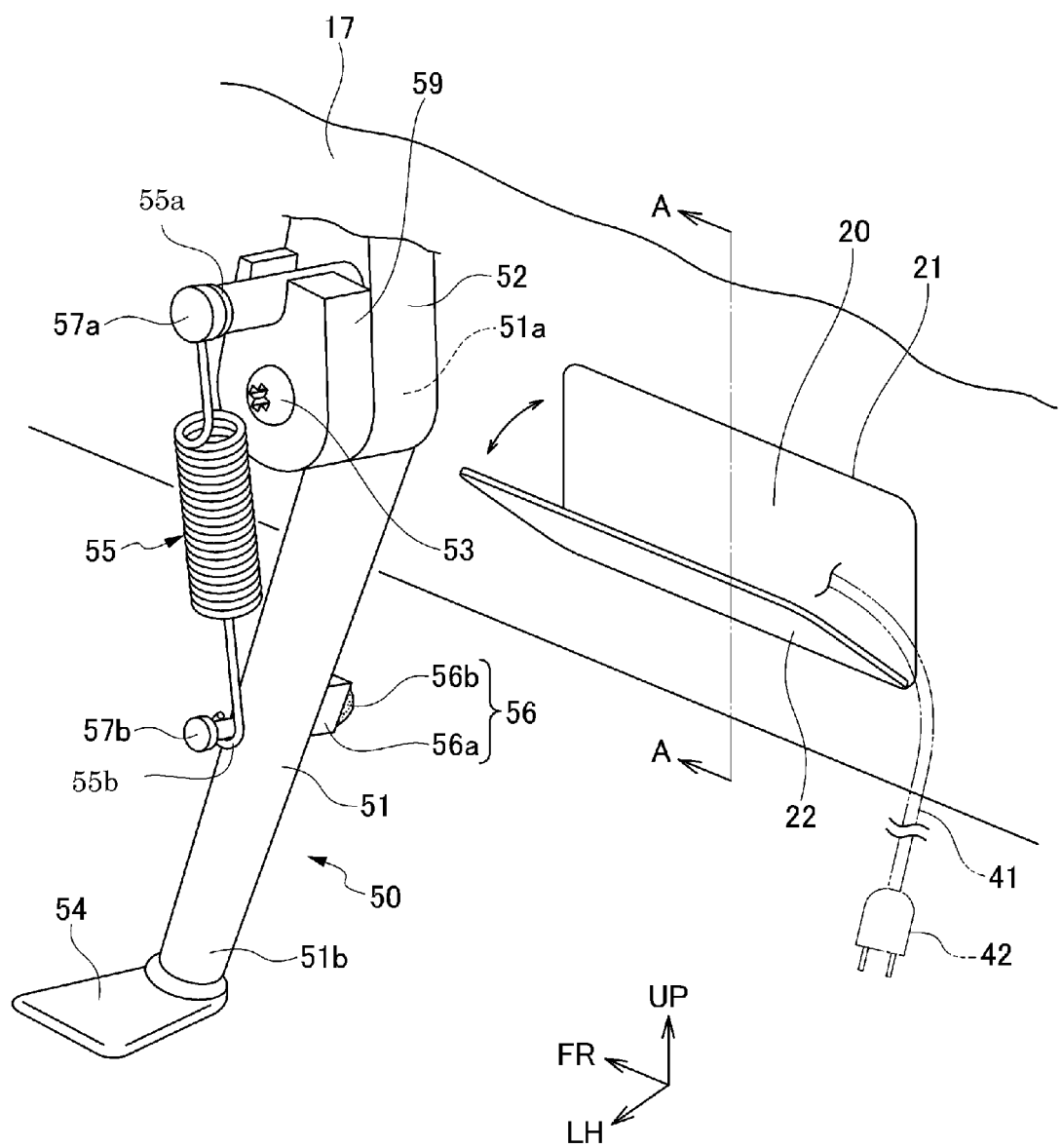
FIG. 4 is a perspective view showing the side kickstand in its upright state and an opening lid in its opened state.
Figure 5:
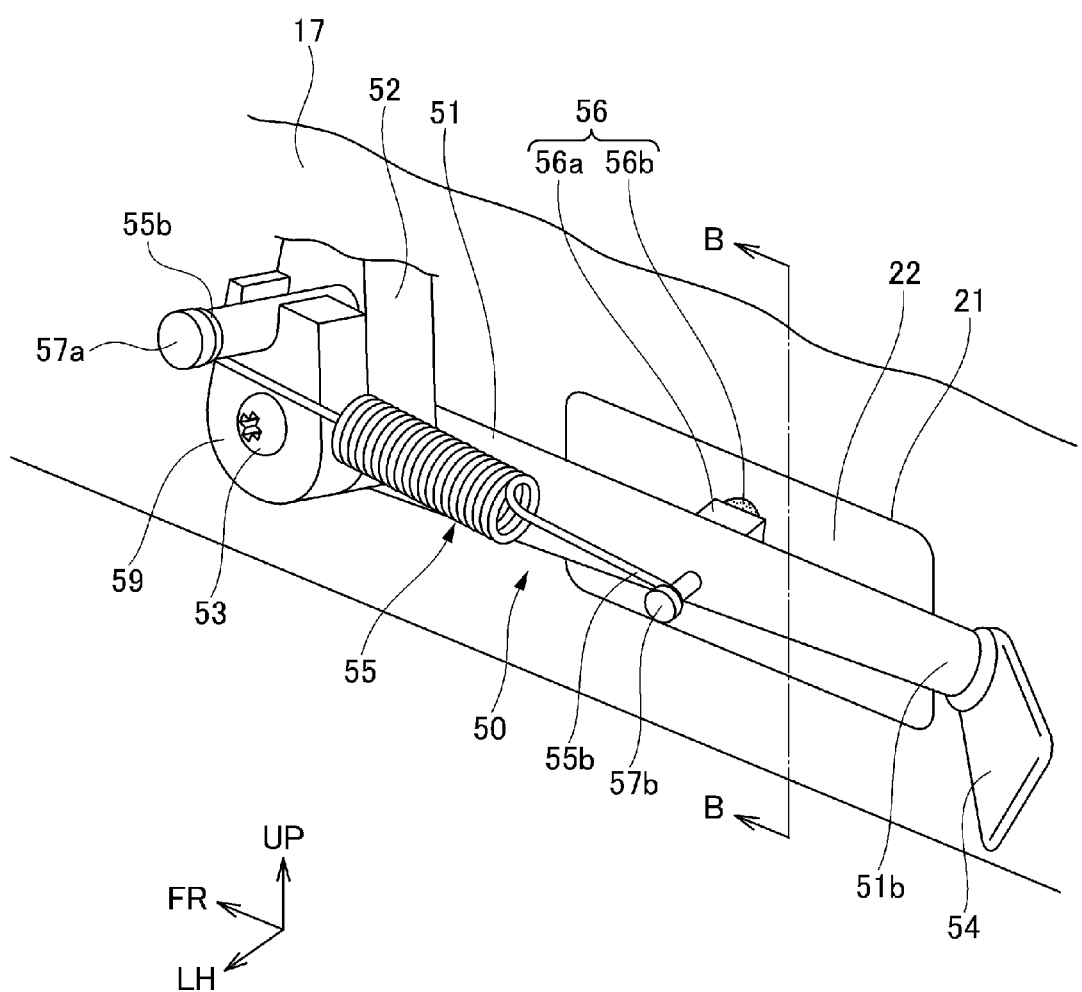
FIG. 5 is a perspective view showing the side kickstand in its retracted state and the opening lid in its closed state.
Figure 6:
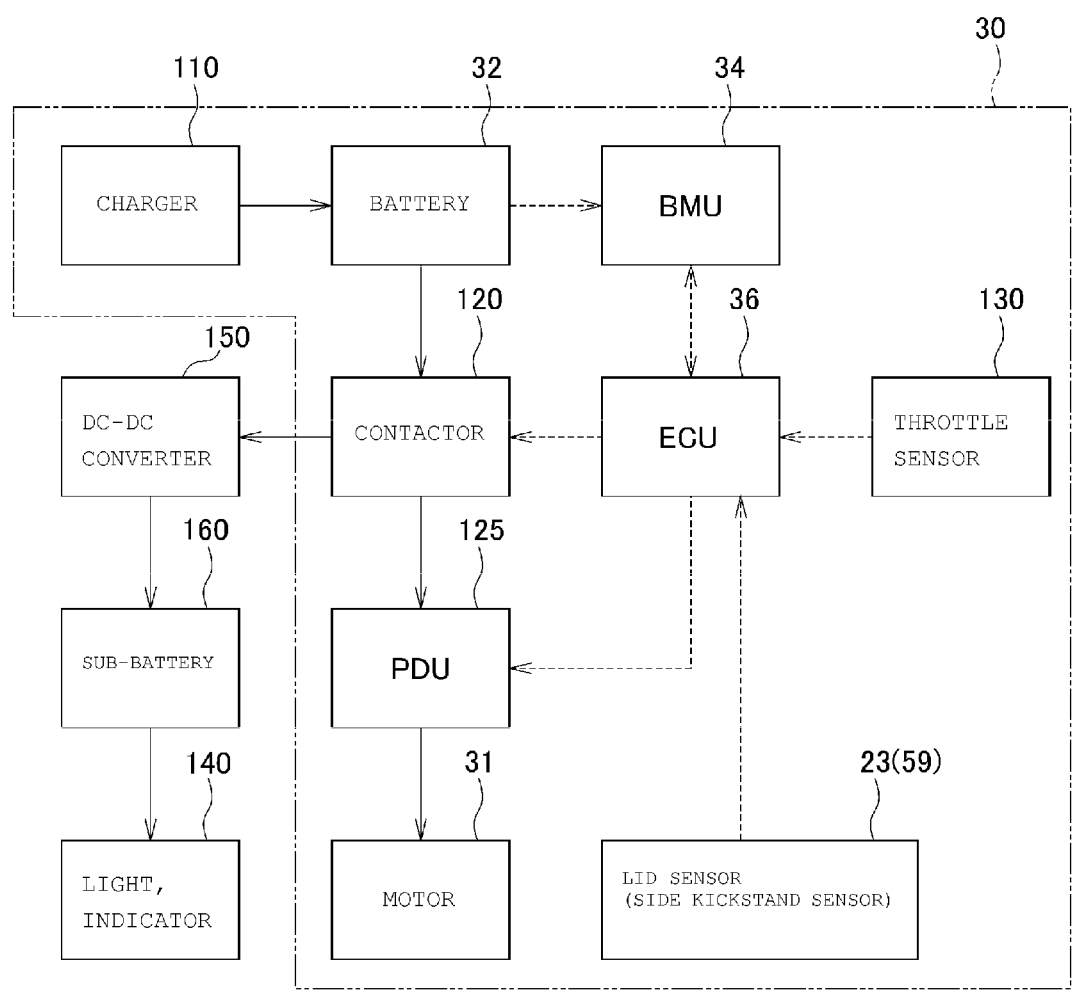
FIG. 6 is a functional block diagram showing a power generation mechanism of the motorcycle according to the first embodiment.
Figure 7:
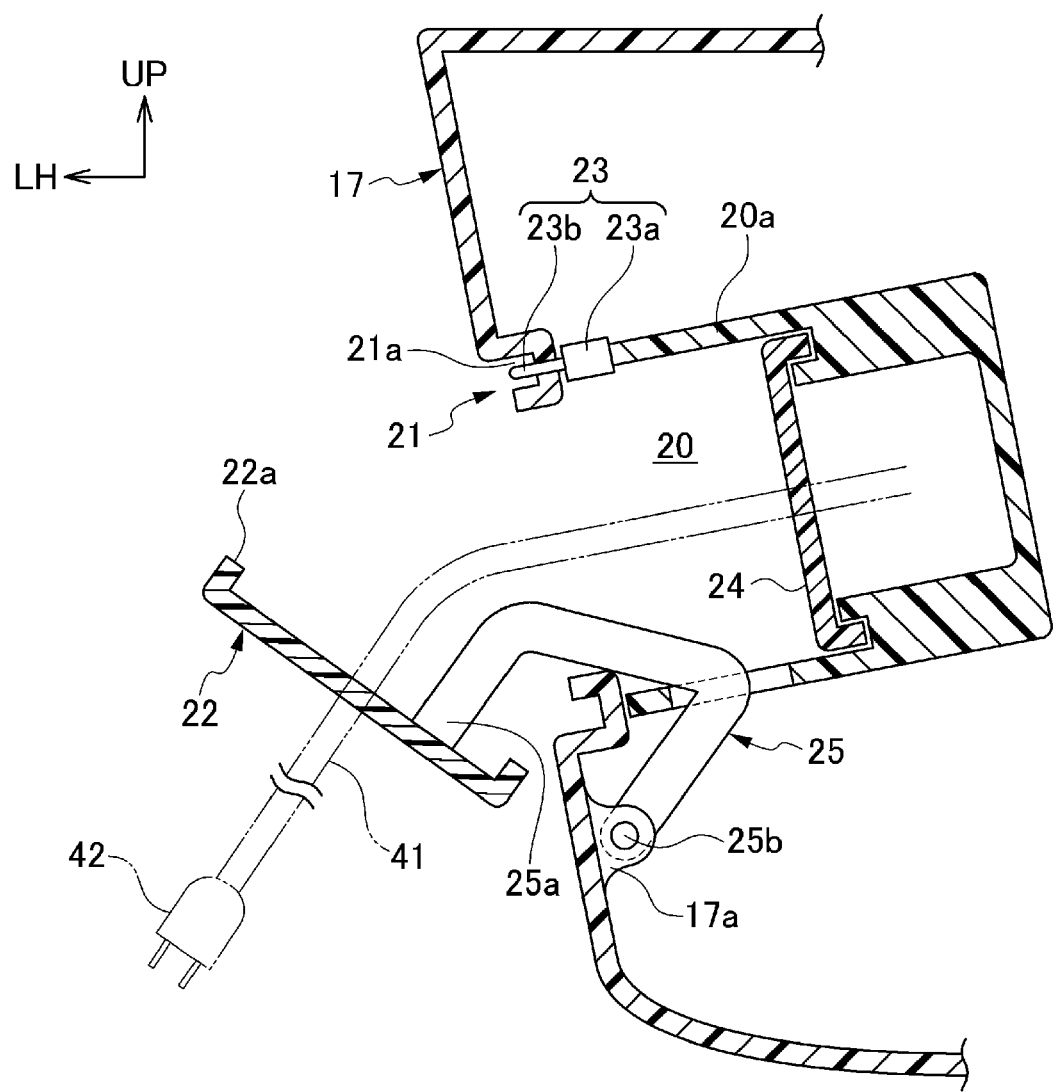
FIG. 7 is a cross-sectional view taken along the line A-A in FIG. 4.
Figure 8:
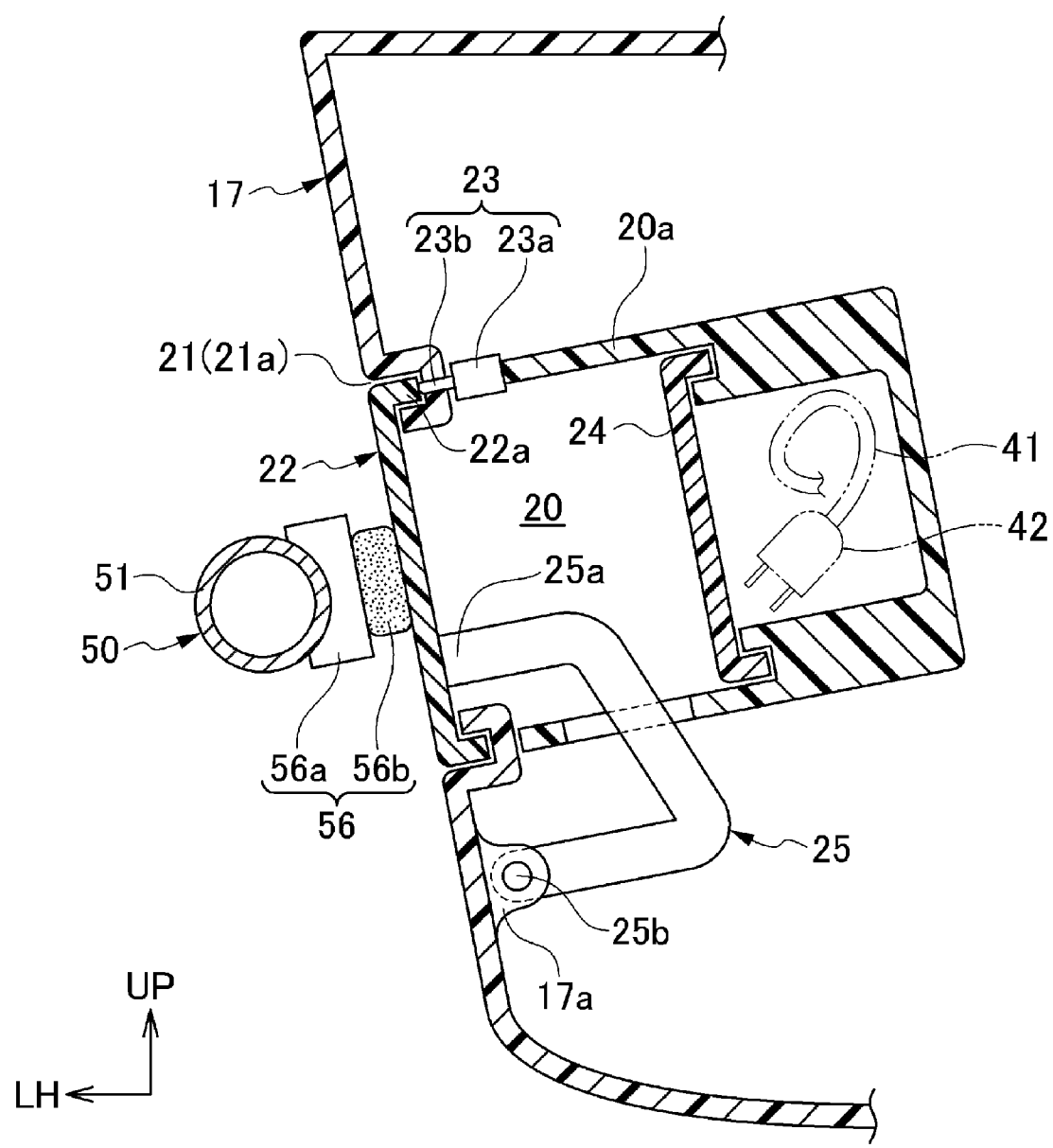
FIG. 8 is a cross-sectional view taken along the line B-B in FIG. 5.
Figure 9:
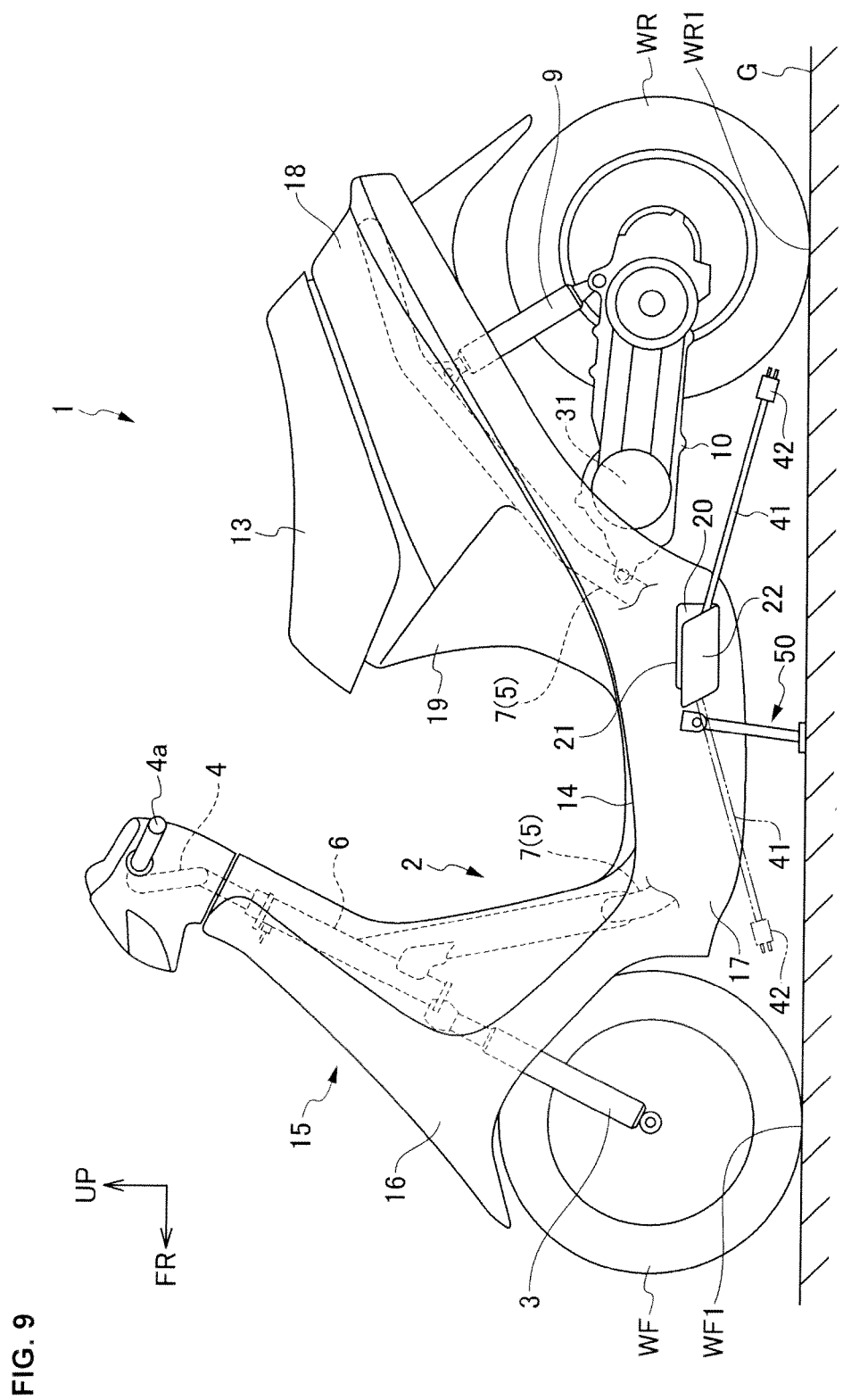
FIG. 9 is a left-side view showing the motorcycle according to the first embodiment of the present invention in a state where the charging cable is extended.

FIG. 4 is a perspective view showing the side kickstand in its upright state and an opening lid in its opened state. FIG. 5 is a perspective view showing the side kickstand in its retracted state and the opening lid in its closed state. FIG. 6 is a functional block diagram showing a power generation mechanism of the motorcycle according to the first embodiment. FIG. 7 is a cross-sectional view taken along the line A-A in FIG. 4. FIG. 8 is a cross-sectional view taken along the line B-B in FIG. 5. FIG. 9 is a left-side view showing the motorcycle according to the first embodiment of the present invention in a state where the charging cable is extended.

Note that, the front-rear, left-right and up-down directions used in the following description are based on the respective directions viewed from the rider on the motorcycle unless otherwise stated. In addition, an arrow FR indicates a forward direction of the vehicle, and an arrow LH indicates a leftward direction of the vehicle while an arrow UP indicates an upward direction of the vehicle.

First, a description will be given of an overall configuration of a motorcycle 1 according to the first embodiment. As shown in FIG. 1 to FIG. 3, the motorcycle 1 according to the first embodiment is mainly configured of a vehicle body frame 5, a front wheel WF, a rear wheel WR, and front forks 3, which pivotally support the front wheel WF at their lower end portions. A handle bar 4 is provided, which is used to steer the front wheel WF, and a swing arm 10 of unit swing type, is suspended on the vehicle body frame 5 via a rear cushion 9. A seat 13 on which the rider sits is provided, as is a step 14 on which the rider puts his or her feet. A cover member 15 covers each portion of the vehicle, and a side kickstand 50, a power generation mechanism 30 which includes a motor 31 and a battery 32, are also provided.

A vehicle body 2 is mainly configured of the vehicle body frame 5, the front forks 3, the handle bar 4, the rear cushion 9, the swing arm 10, the cover member 15 and the like.

The vehicle body frame 5 is formed, for example, by integrally joining steel members of multiple types together by welding or the like. The vehicle body frame 5 is mainly configured of a head pipe 6, paired left and right main frames 7, and multiple cross members (not illustrated).

The head pipe 6 is placed on a front end portion of the vehicle body frame 5 and supports the paired front forks 3, which pivotally support the front wheel WF. The main frames 7 are provided as a left and right pair (only one of the main frames 7 is shown in FIG. 1 to FIG. 3). The paired main frames 7 extend obliquely downward in the rear from the head pipe 6, then extend substantially horizontally in the rear (these horizontally extending portions are not shown in FIG. 1 to FIG. 3), and further extend obliquely upward in the rear in a side view. The cross members connect appropriate portions of the paired left and right main frames 7 together in a vehicle width direction.

The front forks 3 are provided as a left and right pair. The upper end portions of the front forks 3 are connected to the handle bar 4 via the head pipe 6 or the like so as to be steerable by the handle bar 4. The lower end portions of the paired front forks 3 pivotally support the front wheel WF, so that the front wheel WF is rotatable.

The swing arm 10 is attached to the vehicle body frame 5 so as to be swingable in the up-down direction and thereby supports the motor 31.

The seat 13 is placed at a substantially center portion of the vehicle body frame 5 in the front-rear direction.

The step 14 is a portion where the rider puts his or her feet and is arranged between the front wheel WF and the rear wheel WR under a space between the seat 13 and the handle bar 4 in a side view.

The rider can take a riding posture, so-called sit-in because of the seat 13 and the step 14.

The cover member 15 in this example, includes a front cover 16, which covers in front of the handle bar 4 and above the front wheel WF. A side cover 17 covers a lateral side of the vehicle body 2 such as lateral portions of the front forks 13 and a lateral portion of the step 14. A rear cover 18 covers a rear portion of the vehicle and an upper portion of the rear wheel WR, and a center cover 19 covers the vehicle body frame 5 under the seat 13.

The side kickstand 50 is installed at a position on a left side of the vehicle body 2 under the step 14 and near the step 14.

As shown in FIG. 1 to FIG. 5, the side kickstand 50 includes a side kickstand main body 51, a side kickstand attachment portion 52, a side kickstand pivot 53, a side kickstand ground-contact portion 54, a coil spring 55, an attachment-side protrusion 57a, a ground-contact-side protrusion 57b, a restricting portion 56 and a side kickstand sensor 59.

The side kickstand main body 51 is formed of a rod shaped member having a base end portion 51a and a leading end portion 51b.

The side kickstand attachment portion 52 is joined to the vehicle body frame 5.

The side kickstand pivot 53 penetrates through the side kickstand attachment portion 52 and the base end portion 51a of the side kickstand main body 51 and serves as a rotation supporting point of the side kickstand main body 51 (side kickstand 50) with respect to the side kickstand attachment portion 52.

The side kickstand ground-contact portion 54 is joined to the leading end portion 51b of the side kickstand main body 51 and serves as a portion that comes into contact with the ground when the side kickstand 50 is positioned in its upright state.

The upright state refers to the state where motorcycle 1 is kept in the upright position while the motorcycle 1 stops. The retracted state refers to the state to prevent the side kickstand from coming into contact with the ground while the motorcycle 1 travels or is moved while being pushed or pulled by the rider.

One end portion and the other end portion of the coil spring 55 form hook portions 55a and 55b, respectively.

The attachment-side protrusion 57a protrudes outward in a vehicle body left-right direction (left side in this embodiment) from the side kickstand attachment portion 52. The ground-contact-side protrusion 57b also protrudes outward in the vehicle body left-right direction (left side in this embodiment) from the side kickstand main body 51.

The coil spring 55 is connected to the attachment-side protrusion 57a by the hook portion 55a thereof while being connected to the ground-contact-side protrusion 57b by the hook portion 55b thereof.

The coil spring 55 biases the side kickstand main body 51 so that the side kickstand 50 is positioned in either the upright state or the retracted state on the basis of a certain angle as a boundary.

The restricting portion 56 is provided to the side kickstand main body 51 in such a manner as to protrude inward in the vehicle body left-right direction (right side in this embodiment). The restricting portion 56 can include a rigid body portion 56a, which is made of metal and is fixed to the side kickstand main body 51. An elastic portion 56b can be fixed to the rigid body portion 56a. When the side kickstand 50 is positioned in the retracted state, and an opening lid 22 is positioned in a closed state, the elastic portion 56b faces the outer surface of the opening lid 22 in the vehicle body left-right direction.

In the first embodiment, the elastic portion 56b and the outer surface of the opening lid 22 are in contact with each other as shown in FIG. 5 and FIG. 8. Thus, in a case where an attempt to rotate the side kickstand 50 from its upright state to the retracted state is made when the opening lid 22 is in the opened state, the side kickstand 50 comes in contact with the opening lid 22. Accordingly, the side kickstand 50 cannot be rotated from its upright state to its retracted state.

Note that, the elastic portion 56b (side kickstand 50) and the opening lid 22 may not be in contact with each other. In other words, a slight interval may be provided therebetween (not illustrated).

The side kickstand sensor 59 is, in this example, a sensor configured to detect whether the side kickstand 50 is in its upright state or its retracted state, or whether or not the side kickstand 50 is in its retracted state on the basis of an angle of the side kickstand 50. The side kickstand sensor 59 is attached on the outer side of the side kickstand attachment portion 52 in the vehicle body left-right direction (left side in this embodiment).

The power generation mechanism 30 generates power for rotationally driving the rear wheel WR. As shown in FIG. 3, the power generation mechanism 30 can include the motor 31, which drives the rear wheel WR, and the battery 32, which supplies power to the motor 31. A BMU (battery managing unit) 34 and an ECU (electric control unit) 36 are provided.

The motor 31 is attached to the swing arm 10.

The battery 32 is placed under the step 14 and is supported by the vehicle body frame 5 while being connected thereto.

The BMU 34 and the ECU 36 are placed under the step 14 and in the rear of the battery 32 and fixed to the vehicle body frame 5 while being connected thereto.

A description will be given of a functional configuration of the power generation mechanism 30, with reference to FIG. 6.

As shown in FIG. 6, the power generation mechanism 30 can include the battery 32, a charger 110, the motor 31, a PDU (power drive unit) 125, a contactor 120, the BMU 34, a throttle sensor 130 and the ECU 36.

The battery 32 is formed by connecting multiple battery cells together. The battery 32 stores therein power supplied from an external power supply.

The charger 110 is connected to the primary side of the battery 32. The charger 110 is connected to the external power supply (not illustrated) via a charging cable 41 (refer to FIG. 1) serving as a charging electric cable. The charger 110 converts AC power supplied from the external power supply into DC power and supplies the DC power to the battery 32. The charger 110 also controls the charge state of the battery 32.

The motor 31 generates a driving force by the power supplied from the battery 32.

The PDU 125 is placed between the motor 31 and the battery 32. The PDU 125 adjusts the current and voltage supplied to the motor 31 from the battery 32.

The contactor 120 electrically connects or disconnects the battery 32 and the PDU 125 in accordance with control by the ECU 36.

The BMU 34 is connected to the battery 32 and thereby monitors the charge-discharge state of the battery and the temperature and/or other parameters of the battery 32.

The throttle sensor 130 is a sensor configured to detect the operation state of an operator (such as a throttle grip) provided to a handle bar 4a.

The lid sensor 23 is a sensor that detects the opened or closed state of the opening lid 22.

The ECU 36 controls the operation of the power generation mechanism 30 on the basis of a signal inputted thereto from the throttle sensor 130. To put it specifically, the ECU 36 controls the contactor 120 to execute or stop supplying of power to the PDU 125 (motor 31) from the battery 32. In addition, the ECU 36 controls the PDU 125 to control the driving state of the motor 31.

The charging and discharging of the battery 32 is executed on the basis of control by the BMU 34 and the ECU 36.

Moreover, a DC-DC converter 150 and a sub-battery 160 are connected to the power generation mechanism 30 as the components supplying power to a device using low voltage power such as a light or an indicator 140.

The DC-DC converter 150 is connected to the contactor 120. The DC-DC converter 150 converts a high voltage (72V, for example) of the AC power supplied from the battery 32 into a low voltage (12V, for example).

The sub-battery 160 is connected to the DC-DC converter 150 and stores therein the low voltage power converted by the DC-DC converter 150.

The driving force of the motor 31 generated by the power generation mechanism 30 described above is transmitted to the rear wheel WR via a power transmission mechanism (not illustrated) rotatably supporting the rear wheel WR with the swing arm 10.

Next, a detailed description will be given of the charging cable 41 and a cable housing unit 20, which houses therein the charging cable 41.

As shown in FIG. 1, the charging cable 41 is a charging electric cable used for charging the battery 32 from the outside of the motorcycle 1. A leading end portion 42 of the charging cable 41 is formed of a power plug plugged into an outlet of the external power supply. Note that, electric wires of various kinds other than cables may be used instead of the charging cable 41.

As shown in FIG. 1, FIG. 2, FIG. 4, FIG. 5, FIG. 7 and FIG. 8, the cable housing unit 20 serving as an electric cable housing unit is a housing unit used to house the charging cable 41 in the vehicle body 2.

The charging cable 41 is connected to the vehicle body 2 in the cable housing unit 20. This configuration can include a case where the charging cable 41 is fixed to the vehicle body 2 and is not detachable therefrom, and can also include a case where the charging cable 41 is detachably connected to the vehicle body 2.

A housing opening portion 21 is an opening portion opened for inserting or removing the leading end portion 42 of the charging cable 41 into or from the cable housing unit 20. The housing opening portion 21 is at least located under the step 14 and provided to the side cover 17.

The opening lid 22 is a lid member configured to close the housing opening portion 21 and opens while rotating downward.

The housing opening portion 21 and the opening lid 22 are formed on a side where the side kickstand 50 is located in the vehicle body left-right direction and at a position rearward of the side kickstand pivot 53.

In a case where the side kickstand 50 is flipped up rearward and thus positioned in the retracted state, the side kickstand 50 in the retracted state restricts opening of the opening lid 22. To put it specifically, while the side kickstand 50 is in the retracted state, the opening lid 22 cannot be opened because of the presence of the opening lid 22 even if an attempt to open the opening lid 22 is made. The biasing force applied by the coil spring 55 of the side kickstand 50 is normally very high. Thus, a sufficient restricting force to prevent the opening lid 22 from opening is exerted.

As shown in FIG. 7 and FIG. 8, a hinge arm 25 is connected to the inner side of the opening lid 22. One end portion 25a of the hinge arm 25 is fixed to the inner side of the opening lid 22. Another end portion 25b of the hinge arm 25 is rotatably connected to a seating portion 17a, which is provided to the inner side of the side cover 17.

Since the opening lid 22 is rotatably connected to the inner side of the side cover 17 via the hinge arm 25, the opening lid 22 is allowed to transition between the opened state shown in FIG. 7 and the closed state shown in FIG. 8. The hinge arm 25 has a curved shape so as not to interfere with the housing opening portion 21 during the process of transition of the opening lid 22 between the opened state and the closed state.

The opening lid 22 has a protruding edge portion 22a, which protrudes on the inner side in the left-right direction in the closed state.

The housing opening portion 21 has a housing recessed portion 21a, which is used for housing the protruding edge portion 22a of the opening lid 22, in the edge portion of the housing opening portion 21.

The lid sensor 23 is provided in such a manner as to protrude in the housing recessed portion 21a. The lid sensor 23 is mainly configured of a so-called push button switch and includes a base portion 23a and a button portion 23b.

The base portion 23a is fixed to a housing wall portion 20a, which defines the area of the cable housing unit 20. The button portion 23b is provided to the base portion 23a in such a manner as to be protrudable from the base portion 23a toward the housing recessed portion 21a.

As shown in FIG. 8, when the opening lid 22 is in the closed state and the protruding edge portion 22a is housed in the housing recessed portion 21a, the protruding edge portion 22a pushes the button portion 23b in the direction of the base portion 23a. The push button switch is turned ON only in this state, and this ON signal is outputted to the ECU 36. Upon receipt of the ON signal from the push button switch, the ECU 36 determines that the opening lid 22 is in the closed state.

In a state other than the closed state, the opening lid 22 is in the opened state. The opening lid 22 is considered to be in the closed state in all states other than the closed state (the state where the push button switch is turned ON), including the fully opened state to a state close to the closed state.

The opening lid 22 is configured not to be positioned in the closed state while the charging cable 41 is located outside the housing opening portion 21. Even if an attempt to position the opening lid 22 in the closed state is made while the charging cable 41 is located outside the housing opening portion 21, the charging cable 41 is held between the housing opening portion 21 and the opening lid 22. Thus, the opening lid 22 cannot be positioned in the closed state.

An inner lid 24 is provided inside the cable housing unit 20 and covers the charging cable 41 housed in the cable housing unit 20. The inner lid 24 partitions the inside of the cable housing unit 20 between the housing opening portion 21 side and a deeper side.

The inner lid 24 is, in certain embodiments, rotatably connected to the inner side of the side cover 17 via a hinge arm (not illustrated) as in the case of the opening lid 22.

The motorcycle 1 according to the first embodiment informs the rider of the opened state of the opening lid 22 upon detection of the opened state of the opening lid 22 by the lid sensor 23. To put it specifically, as shown in FIG. 7, when the opening lid 22 is positioned in the opened state and the protruding edge portion 22a is no longer housed in the housing recessed portion 21a, the protruding edge portion 22a no longer pushes the button portion 23b. In this state, the push button switch is OFF, and thus, no ON signal is outputted to the ECU 36. In other words, since the ECU 36 receives no ON signal of the push button switch, the ECU 36 can judge that the opening lid 22 is in the opened state.

When judging that the opening lid 22 is in the opened state, the ECU 36 informs the rider of the opened state of the opening lid 22 by reducing the output of the motor 31 even if the motor 31 is driven. This can include stopping the output of the motor 31 (the vehicle cannot travel), providing an upper limit for the number of revolutions of the motor 31 (speed limit function), and the like.

In the first embodiment, the side kickstand sensor 59 can be used a lid sensor. Unless the opening lid 22 is in the closed state, the side kickstand 50 cannot be completely positioned in the retracted state. Thus, when detecting that the side kickstand 50 is in the retracted state, the side kickstand sensor 59 can also detect that the opening lid 22 is in the closed state at the same time.

The motorcycle 1 according to the first embodiment reduces or stops the output of the motor 31 when the side kickstand sensor 59 detects that the side kickstand 50 is in the upright state (not in the retracted state).

As shown in FIG. 9, the length of the charging cable 41 is set at a length not reaching a contact patch WF1 of the front wheel WF and a contact patch WR1 of the rear wheel WR. The contact patch WF1 of the front wheel WF is a portion of the outer surface of the front wheel WF that actually comes in contact with a ground G or the like and that normally has a substantially rectangular shape. The same applies to the contact patch WR1 of the rear wheel WR.

According to the motorcycle 1 of the first embodiment described above, the following effects are brought about, for example.

In the first embodiment, the housing opening portion 21 is at least located under the step 14 and provided to the side cover 17. Thus, since the charging cable 41 can be removed from the area under the step 14, the step 14 is unlikely to hinder the removing of the charging cable 41 from the cable housing unit 20. Moreover, since the charging cable 41 can be removed from the area under the step 14, the removed charging cable 41 is placed near the ground G where an outlet of an external power supply is normally placed. Thus, the length of the charging cable 41 can be reduced.

In the first embodiment, the opening lid 22 cannot be positioned in the closed state while the charging cable 41 is located outside the housing opening portion 21. In addition, upon detection of the opened state of the opening lid 22 by the lid sensor 23, the rider is informed of the opened state of the opening lid 22. Thus, it is possible to prevent the rider from forgetting to house the charging cable 41 in the cable housing unit 20 and to close the opening lid 22.

In the first embodiment, the rider is informed of the opened state of the opening lid 22 by reduction or stopping of the output of the motor 31. Thus, it is not necessary to additionally provide an indicator or the like to inform the rider of the opened state of the opening lid 22.

In a case where the side kickstand sensor 59 detects that the side kickstand 50 is in the upright state, i.e., that the side kickstand 50 is not in the retracted state, the output of the motor 31 is reduced or stopped. Thus, it is possible to surely let the rider recognize that the side kickstand 50 is in the upright state, i.e., that the side kickstand 50 is not in the retracted state. In addition, it is not necessary to additionally provide an indicator or the like to inform the rider that the side kickstand 50 is not in the retracted state.

In the first embodiment, in a case where the side kickstand 50 is flipped up rearward and thus positioned in the retracted state, the side kickstand 50 in the retracted state restricts opening of the opening lid 22. Accordingly, the side kickstand 50 in the retracted state can prevent the opening lid 22 from opening while the motorcycle 1 is in traveling operation.

In the first embodiment, the charging cable 41 housed in the cable housing unit 20 is covered by the inner lid 24 even when the side kickstand 50 is in the upright state and the opening lid 22 is opened. Thus, the charging cable 41 can be protected.

Even when the motorcycle 1 is moved forward or rearward while being pushed or pulled by the rider in a state where the charging cable 41 is located outside the housing opening portion 21, the charging cable 41 is not run over by the rear wheel WR or the front wheel WF.

The ECU 36 is provided under the step 14. Thus, it is possible to reduce the length of the signal line used for transmitting a signal outputted from the lid sensor 23 (side kickstand sensor 59), which is normally positioned near the housing opening portion 21 located under the step 14.

Next, a description will be given of other embodiments of the motorcycle of the present invention with reference to the drawings. Note that, the same reference numerals are assigned to the component elements identical to those in the first embodiment and the description of these component elements are either omitted or simplified in the following description.

Figure 10:
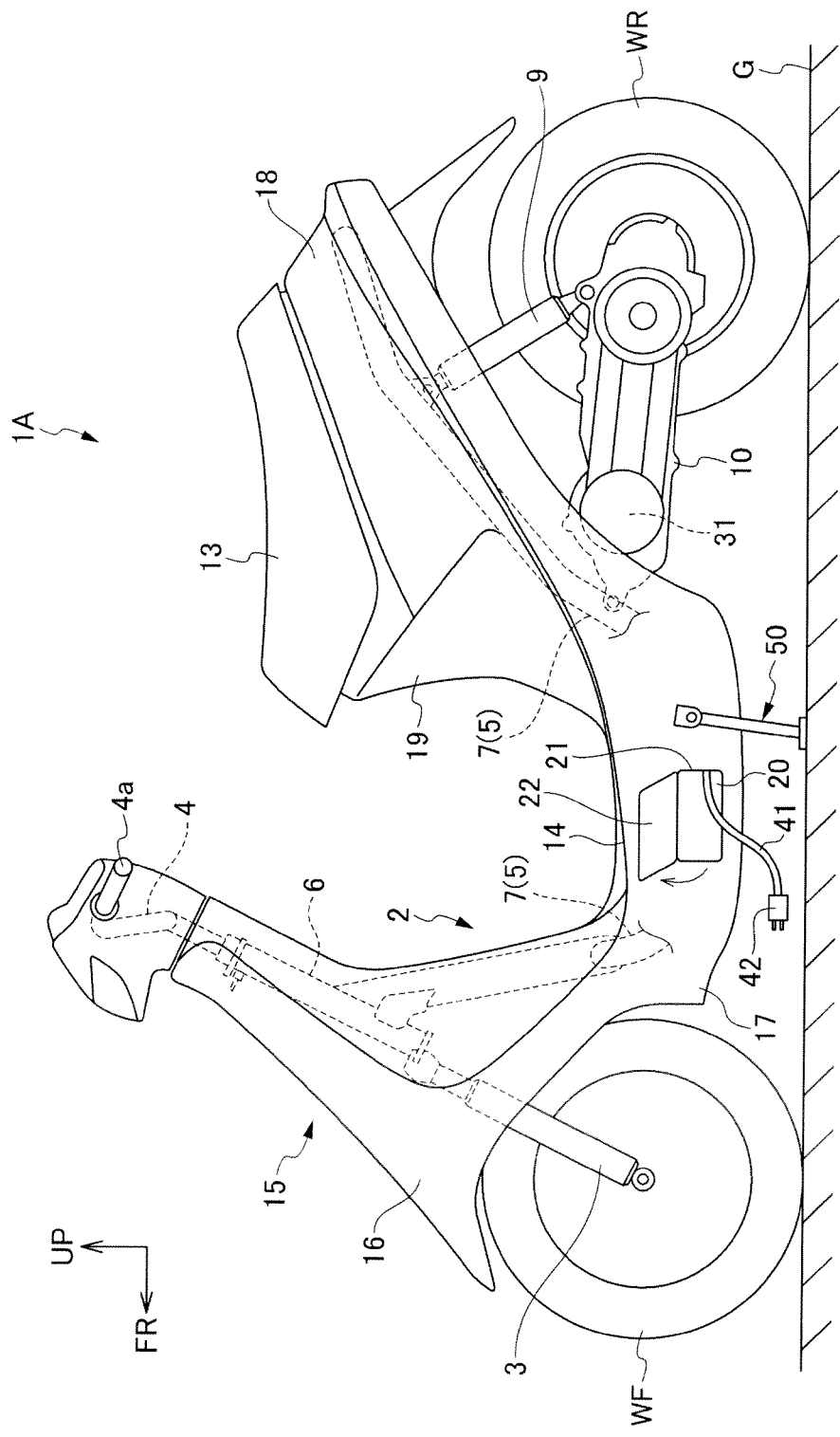
FIG. 10 is a left-side view showing a motorcycle according to a second embodiment of the present invention in a state where a side kickstand is positioned in its upright state, and a charging cable is removed from a cable housing unit.

FIG. 10 is a left-side view showing a motorcycle according to a second embodiment of the invention in a state where the side kickstand is positioned in its upright state, and the charging cable is removed from the cable housing unit. As shown in FIG. 10, the motorcycle 1A according to the second embodiment is different as compared with the first embodiment mainly in the position of the housing opening portion 21 (position in the vehicle body front-rear direction) with respect to the side kickstand 50 and the opening and closing direction of the opening lid 22.

The housing opening portion 21 is provided in front of the side kickstand 50. In addition, the opening lid 22 opens while rotating upward. The other parts of the configuration are the same as those in the first embodiment.

According to the motorcycle 1A of the second embodiment, the following effects are brought about, for example, in addition to the same effects as those described in the first embodiment.

According to the second embodiment, the region in front of the side kickstand 50 that is likely to be a dead space can be effectively utilized by using the region for the housing opening portion 21. In addition, the degree of freedom in layout of the housing opening portion 21 is high.

Figure 11:
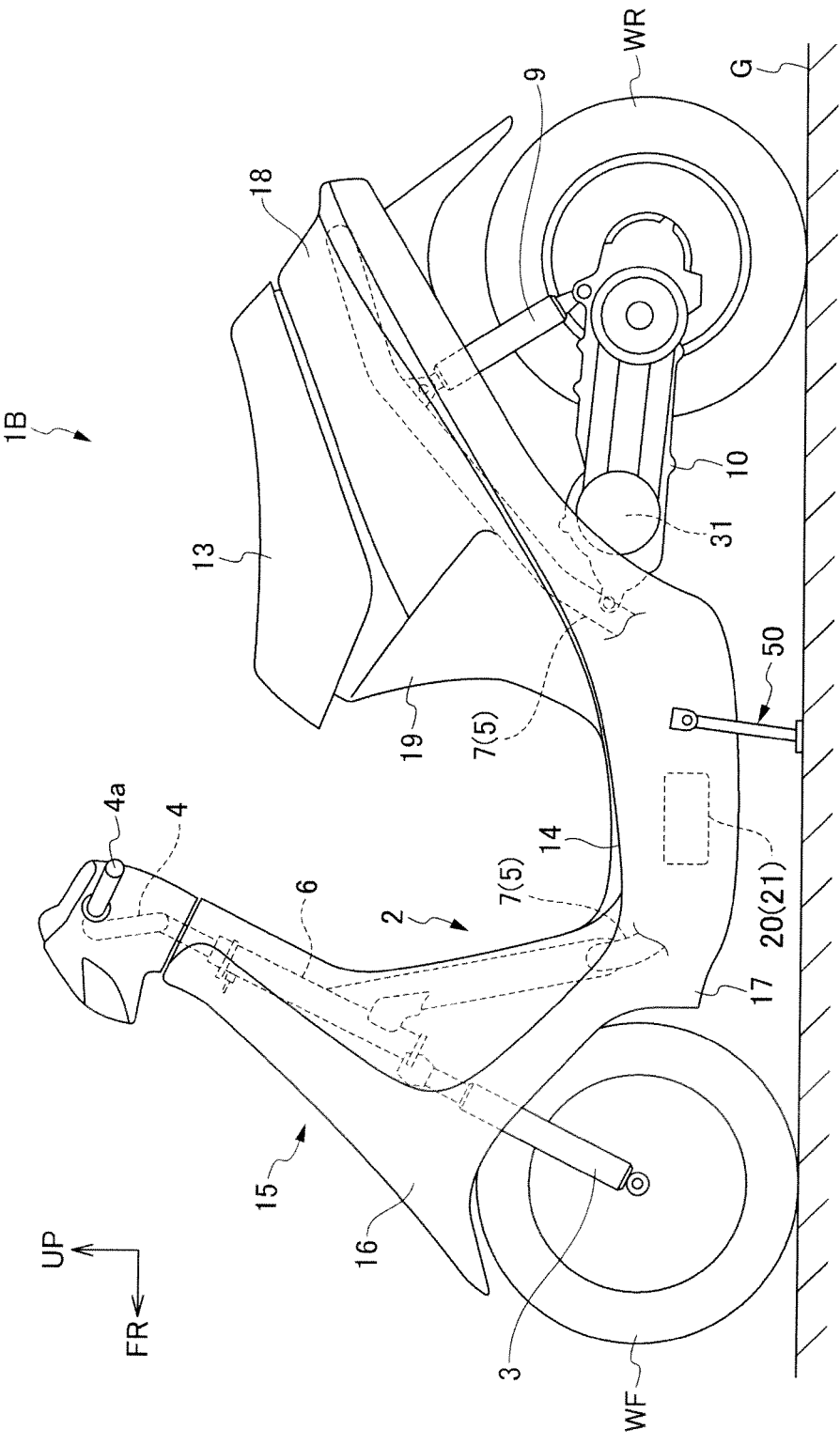
FIG. 11 is a left-side view showing a motorcycle according to a third embodiment of the present invention in a state where a side kickstand is positioned in its upright state.

Next, a description will be given of the third embodiment with reference to FIG. 11. FIG. 11 is a left-side view showing a motorcycle according to the third embodiment of the present invention in a state where the side kickstand is positioned in its upright state.

As shown in FIG. 11, the motorcycle 1B according to the third embodiment is different as compared with the second embodiment mainly in the position of the housing opening portion 21 (position in the vehicle body left-right direction) with respect to the side kickstand 50.

In the third embodiment, while the side kickstand 50 is provided on the left side of the vehicle body, the housing opening portion 21 (opening lid 22) is provided on the right side of the vehicle body (the housing opening portion 21 is shown by a broken line in FIG. 11). To put it in another way, the housing opening portion 21 (opening lid 22) and the side kickstand 50 are provided respectively on the sides opposed to each other in the vehicle body left-right direction in the third embodiment.

According to the motorcycle 1B of the third embodiment, the same effects as those described in the second embodiment are brought about.

Note that, in the third embodiment, the positions of the housing opening portion 21 and the side kickstand 50 in the vehicle body left-right direction and the vehicle body front-rear direction are not limited to the positions shown in FIG. 11.

Figure 12:
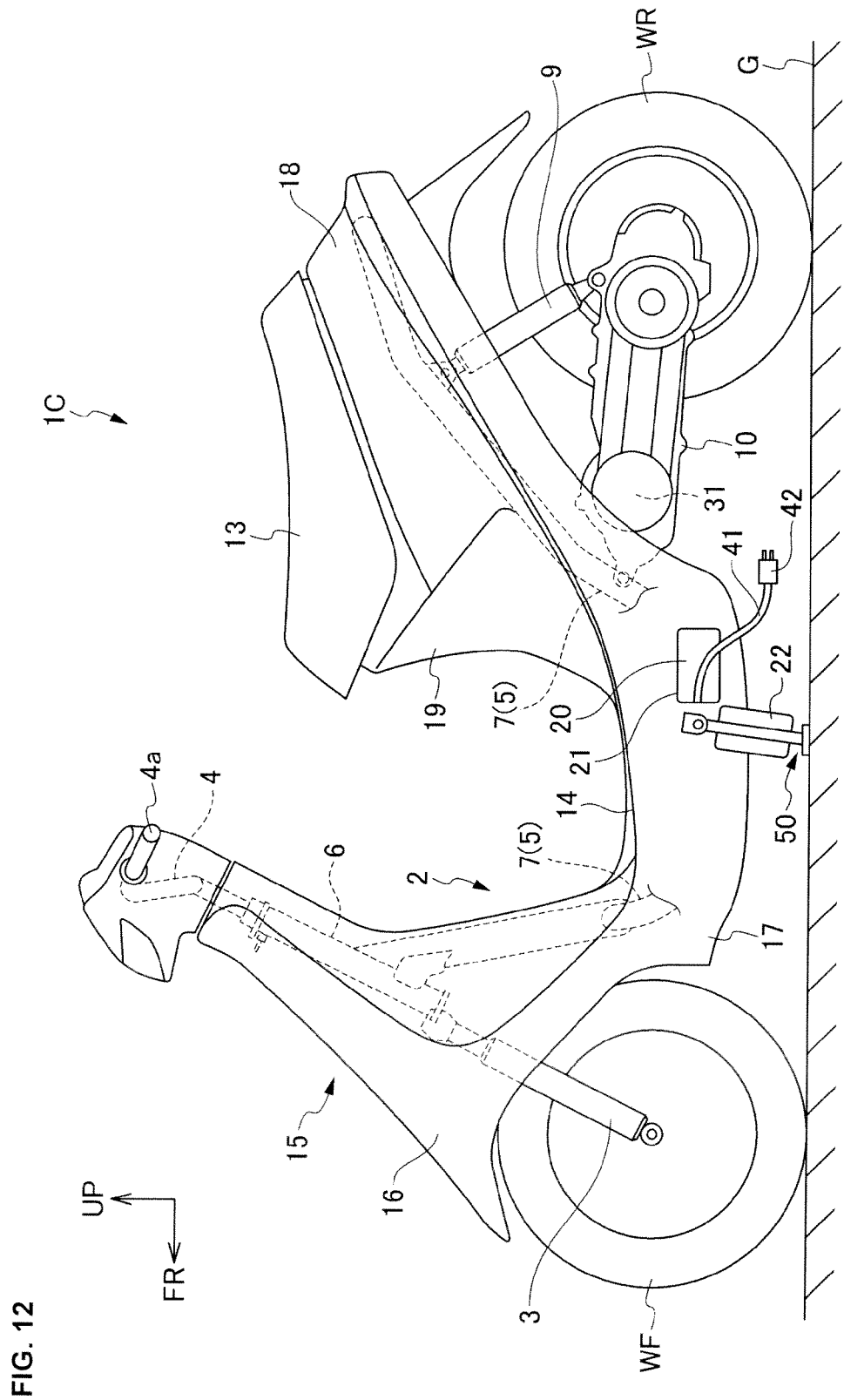
FIG. 12 is a left-side view showing a motorcycle according to a fourth embodiment of the present invention in a state where a side kickstand is positioned in its upright state, and a charging cable is removed from a cable housing unit.
Figure 13:
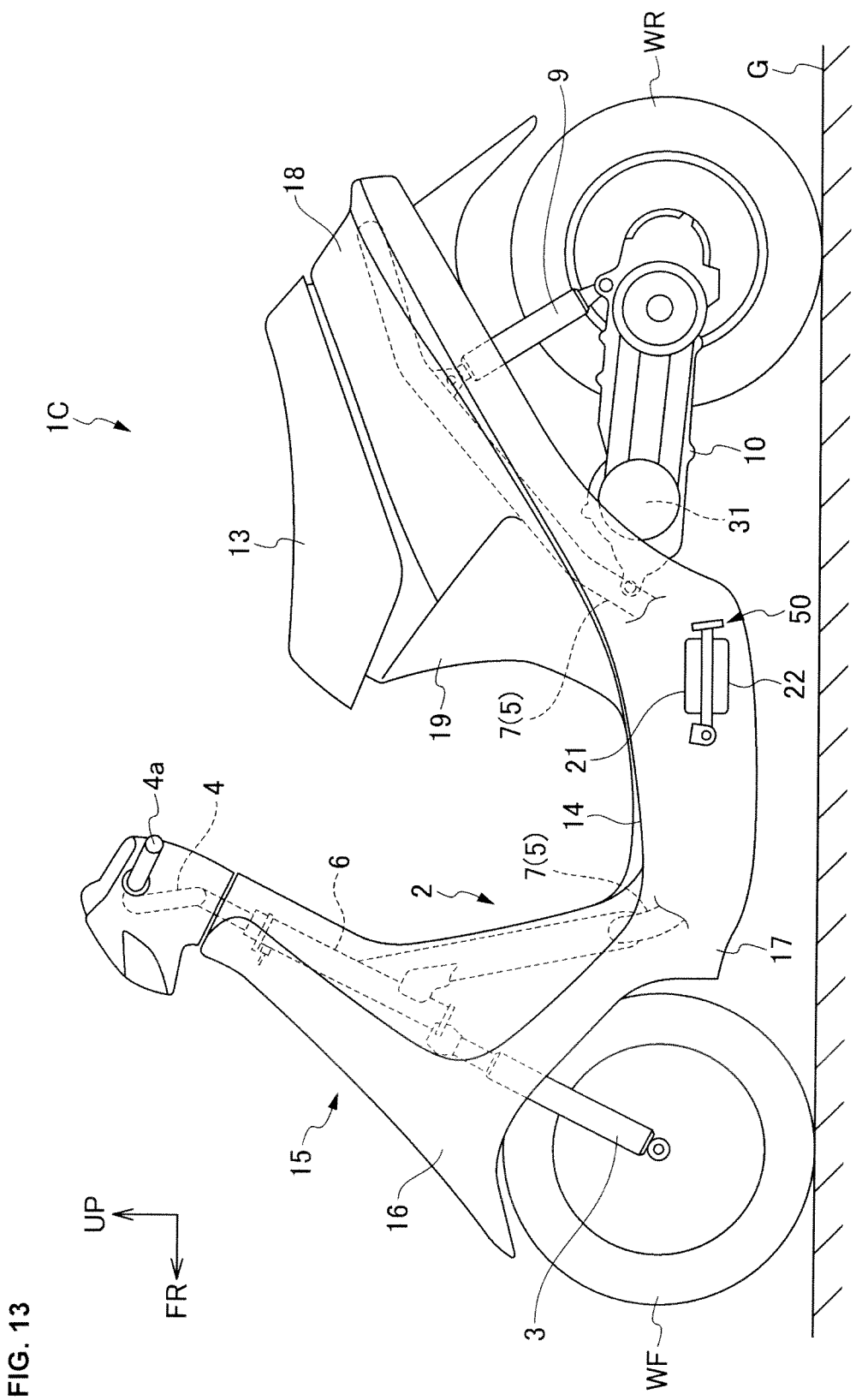
FIG. 13 is a left-side view showing the motorcycle according to the fourth embodiment of the present invention in a state where the side kickstand is positioned in its retracted state and the charging cable is housed in the cable housing unit.

Next, a description will be given of the fourth embodiment with reference to FIG. 12 and FIG. 13. FIG. 12 is a left-side view showing a motorcycle according to the fourth embodiment of the present invention in a state where the side kickstand is positioned in its upright state and the charging cable is removed from the cable housing unit. FIG. 13 is a left-side view showing the motorcycle according to the fourth embodiment of the present invention in a state where the side kickstand is positioned in its retracted state and the charging cable is housed in the cable housing unit.

As shown in FIG. 12 and FIG. 13, the motorcycle 1C according to the fourth embodiment is mainly different as compared with the first embodiment in the position where the opening lid 22 is provided.

To put it specifically, in the fourth embodiment, the opening lid 22 is provided on the inner side of the side kickstand 50 in the vehicle body left-right direction (right side in the fourth embodiment). In this configuration, the opening lid 22 is configured to be opened or closed by the operation to position the side kickstand 50 in its upright state or its retracted state.

To put it more specifically, while the side kickstand 50 is in its upright state as shown in FIG. 12, the opening lid 22 separates from the housing opening portion 21 together with the side kickstand 50. Accordingly, the housing opening portion 21 is opened. In this state, the leading end portion 42 of the charging cable 41 can be removed from the cable housing unit 20.

Meanwhile, while the side kickstand 50 is in its retracted state as shown in FIG. 13, the opening lid 22 comes near to the housing opening portion 21 together with the side kickstand 50 and closes the housing opening portion 21. In this state, the leading end portion 42 of the charging cable 41 cannot be removed from the cable housing unit 20.

In addition, the opening lid 22 is configured not to be positioned in the closed state while the charging cable 41 is located outside the housing opening portion 21.

Although not illustrated, the lid sensor 23, which detects the opened or closed state of the opening lid 22, is provided to the cable housing unit 20 as in the case of the first embodiment.

The motorcycle 1C according to the fourth embodiment reduces or stops the output of the motor 31 in a case where the lid sensor 23 detects the opened state of the opening lid 22. Upon detection of the opened state of the opening lid 22 by the lid sensor 23, no ON signal of the push button switch is outputted to the ECU 36. Upon receipt of no ON signal of the push button switch, the ECU 36 reduces or stops the output of the motor 31 via the PDU 125 even if an attempt is made to drive the motor 31.

According to the motorcycle 1C of the fourth embodiment, the following effect is brought about, for example, in addition to the same effects as those described in the first embodiment. The opening lid 22 is configured to be opened or closed by the operation to position the side kickstand 50 in its upright state or its retracted state. Thus, the opening lid 22 can be easily opened or closed.

The lid sensor 23, which is provided to the cable housing unit 20, can be used as a side kickstand sensor for detecting whether the side kickstand is in its upright state or retracted state.

Meanwhile, the existing side kickstand sensor can be used to detect the opened or closed state of the opening lid 22. Then, in a case where the sensor for detecting the opened or closed state of the opening lid 22, which is provided to any one of the cable housing unit 20 and the side kickstand 50, detects the opened state of the opening lid 22, the output of the motor 31 is reduced. Thus, the rider can be informed of the states of the side kickstand 50 and the opening lid 22.

The preferred embodiments of the present invention have been described above. However, the present invention is not limited to the above described embodiments and can be carried out in various modes.

The motorcycles described in the above embodiments are of scooter type, for example, but the present invention can be applied to a motorcycle of another type as long as the motorcycle has a side cover.

The opening and closing direction of the opening lid 22 is not limited to any particular direction. The opening lid 22 may be of a structure detachable from the side cover 17 instead of the openable structure.

The configuration of the lid sensor 23 is not limited to any particular configuration. Upon detection of the opened state of the opening lid 22 by the lid sensor 23, sound or light can be generated to inform the rider of the opened state.

In the above described embodiments, the present invention is applied to the motorcycles 1, each of which travels by rotationally driving the rear wheel WR only using the driving force of the motor 31, but the present invention is not limited to this case. To put is specifically, the present invention may be applied to a hybrid type motorcycle that travels by rotationally driving a rear wheel by combination of two power sources including the power generated by an internal combustion engine and the power of the motor.

To put it more specifically, the term, "motor," herein is a concept including an electric motor that obtains power solely by electricity, and a hybrid power unit or the like obtained by combination of the electric motor and an internal combustion engine. To put it in another way, the motor is not limited to any particular type as long as a power unit that obtains power entirely or partially by an electric motor is employed.

Explanation of Reference Numerals 1 motorcycle
2 vehicle body
14 step
17 side cover
20 electric cable housing unit
21 housing opening portion
22 opening lid
23 lid sensor
24 inner lid
31 motor
32 battery
41 charging electric cable
42 leading end portion
50 side kickstand
53 side kickstand pivot
59 side kickstand sensor
WF front wheel
WF1 contact patch
WR rear wheel
WR1 contact patch

The invention claimed is:

1. A motorcycle, comprising:
a vehicle body;
a front wheel;
a rear wheel;
a motor;
a battery configured to supply power to the motor;
a step disposed between the front wheel and the rear wheel in a side view, and configured to support feet of a rider;
a side cover configured to cover a lateral side of the vehicle body;
a charging electric cable configured for charging the battery from an outside power source;
an electric cable housing unit configured to house the charging electric cable in the vehicle body, and in which the charging electric cable is connected to the vehicle body;
a housing opening portion configured to be opened for inserting or removing a leading end portion of the charging electric cable into or from the electric cable housing unit;
an opening lid configured to close the housing opening portion; and
an inner lid provided inside the electric cable housing unit, and configured to cover the charging electric cable housed in the electric cable housing unit,
wherein the housing opening portion is at least located under the step and provided to the side cover.

2. The motorcycle according to claim 1, further comprising:
a lid sensor configured to detect an opened or closed state of the opening lid, wherein the opening lid is configured not to be positioned in the closed state while the charging electric cable is located outside the housing opening portion, and wherein upon detection of the opened state of the opening lid by the lid sensor, a signal is generated regarding the opened state of the opening lid.

3. The motorcycle according to claim 2, wherein the signal comprises a reduction in an output of the motor.

4. The motorcycle according to claim 1, further comprising:
a side kickstand disposed near the step,
wherein the housing opening portion and the opening lid are placed, on a side where the side kickstand is located in a vehicle body left-right direction, and at a position rearward of a side kickstand pivot serving as a rotation supporting point of the side kickstand, and wherein, when flipped up rearward and thus positioned in its retracted state, the side kickstand in the retracted state restricts opening of the opening lid.

5. The motorcycle according to claim 1, further comprising:
a side kickstand disposed near the step,
wherein the side kickstand is configured such that, when the opening lid is in the opened state, the opening lid comes in contact with the side kickstand to prevent the side kickstand from rotating from its upright state to its retracted state, wherein the side kickstand includes a side kickstand sensor configured to detect whether or not the side kickstand is in the retracted state, and wherein in a case where the side kickstand sensor detects that the side kickstand is not in the retracted state, the output of the motor is reduced.

6. The motorcycle according to claim 1, further comprising:
a side kickstand disposed near the step,
wherein the opening lid is attached to the side kickstand and thus configured to be opened or closed by an operation to position the side kickstand in its upright state or its retracted state.

7. The motorcycle according to claim 6, wherein the opening lid is configured not to be positioned in a closed state while the charging electric cable is located outside the housing opening portion, wherein a sensor configured to detect the opened or closed state of the opening lid is provided to one of the electric cable housing unit and the side kickstand, and wherein, upon detection of the opened state of the opening lid by the sensor, the output of the motor is reduced.

8. The motorcycle according to claim 1, wherein the charging electric cable is set at a length not reaching a contact patch of the rear wheel.

9. The motorcycle according to claim 1, wherein the charging electric cable is set at a length not reaching a contact patch of the front wheel.

10. A motorcycle, comprising:
a vehicle body;
a front wheel;
a rear wheel;
motor means for providing motive power for the vehicle;
energy storage means for supplying power to the motor means;
step means for supporting a rider, said step means being disposed between the front wheel and the rear wheel in a side view;
cover means for covering a lateral side of the vehicle body;
cable means for charging the energy storage means from an external power source;
housing means for housing the cable means in the vehicle body, and for connecting the cable means to the vehicle body;
a housing opening portion configured to be opened for inserting or removing a leading end portion of the cable means into or from the housing means;
opening lid means for closing the housing opening portion, wherein the housing opening portion is disposed under the step means and provided to the cover means; and
inner lid means for covering the cable means housed in the housing means, said inner lid means provided inside the housing means.

11. The motorcycle according to claim 10, further comprising:

sensor means for detecting an opened or closed state of the opening lid means,
wherein the opening lid means is configured so as not to be closable while the cable means is located outside the housing opening portion, and wherein upon detection of an opened state of the opening lid means by the sensor means, a signal is generated regarding the opened state of the opening lid means.

12. The motorcycle according to claim 11, wherein the signal comprises a reduction in an output of the motor means.

13. The motorcycle according to claim 10, further comprising:
kickstand means for supporting the motorcycle, said kickstand means disposed near the step means,
wherein the housing opening portion and the opening lid means are disposed, on a side where the kickstand means is located in a vehicle body left-right direction, and at a position rearward of a pivot means for providing pivotal rotation at a supporting point of the kickstand means, and wherein, when being flipped up rearward and thus positioned in a retracted state, the kickstand means restricts opening of the opening lid means.

14. The motorcycle according to claim 10, further comprising:
kickstand means for supporting the motorcycle, said kickstand means being disposed near the step means,
wherein the kickstand means is configured such that when the opening lid means is in an opened state, the opening lid means comes in contact with the kickstand means to prevent the kickstand means from rotating from an upright state to a retracted state, wherein the kickstand means includes kickstand sensor means for detecting whether or not the kickstand means is in the retracted state, and wherein when the kickstand sensor means detects that the kickstand is not in the retracted state, the output of the motor means is reduced.

15. The motorcycle according to claim 10, further comprising:
kickstand means disposed near the step means, said kickstand means for supporting the motorcycle,
wherein the opening lid means is attached to the kickstand means and configured to be opened or closed by an operation to position the kickstand means in an upright state or a retracted state.

16. The motorcycle according to claim 15, wherein the opening lid means is configured not to be positioned in a closed state while the cable means is located outside the housing opening portion,
said motorcycle further comprising sensor means for detecting the opened or closed state of the opening lid means, said sensor means being provided to one of the housing means the kickstand means,
wherein, upon detection of the opened state of the opening lid means by the sensor means, the output of the motor means is reduced.

17. The motorcycle according to claim 10, wherein the cable means comprises a cable having a length which is set such that the cable means cannot reach a contact patch of the rear wheel.

18. The motorcycle according to claim 10, wherein said cable means comprises a cable having a length which is set so as to not reach a contact patch of the front wheel.

* * * * *